April 19, 1966  A. J. W. M. VAN OVERBEEK  3,247,459
PLURAL LASER AMPLIFIERS IN TANDEM
Filed May 1, 1964

INVENTOR.
ADRIANUS J.W.M. VAN OVERBEEK
BY
AGENT 3,247,459
PLURAL LASER AMPLIFIERS IN TANDEM
Adrianus Johannes Wilhelmus Marie van Overbeek, Emmasingel, Eindhoven, Netherlands, assignor to North American Philips Company, Inc., New York, N.Y., a corporation of Delaware
Filed May 1, 1964, Ser. No. 364,159
Claims priority, application Netherlands, May 3, 1963, 292,324
2 Claims. (Cl. 330—4.3)

The invention relates to a light amplifier comprising at least two diode lasers.

Diode lasers are employed for amplifying light striking the input of the amplifier and leaving the amplifier at the output in an amplified state. The amplifier may comprise, at its input, optical means for concentrating the light on the active part of the diode laser. Such lasers are known per se and their effect is based on the fact that, when a supply current is fed to a p-n junction of a semiconductor, for example gallium-arsenide, charge carriers are brought to a higher energy state. With a drop to lower energy states light of a characteristic wave-length is emitted. This process is stimulated by supplying light of given frequencies, so that the total quantity of emitted light of these frequencies is higher than the quantity of incident light, or in other words, amplification has taken place.

With a low supply current this amplification is very low and there may even occur attenuation. According as the supply current is higher, the amplification increases. However, this is limited in practice, since the amplified light is partly reflected and is again amplified. In this way spontaneous generation of light of a given frequency may occur in excess of a given, critical current intensity.

In order to achieve a reasonable amplification it is necessary to raise the supply current to a value just below the critical current intensity. However, the amplification increases at this point to an enormous extent with the current intensity, so that with small random variations of the supply current the amplification varies strongly and even spontaneous self-oscillation may occur. This may be avoided by choosing a slightly lower supply curent, which, however, involves that the amplification may be insufficient for the desired purpose.

By analogy to other amplifiers it might be considered connecting a number of diode lasers in cascade for further raising the amplification. In this case such lasers must be optically coupled, so that the light from the output of the first laser is concentrated on the input of the subsequent laser. However, this involves the disadvantage that the light supplied by the first laser to the second laser is partly reflected, subsequent to amplification, by said laser, towards the first laser, so that so to say an amplified reflection occurs. This reflection may again result in spontaneous self-oscillation of the amplifier.

The invention obviates this disadvantage.

In accordance with the invention the output of a first diode laser is optically coupled with the input of a second diode laser and the supply current of the lasers is modulated by periodic pulses, while the transit time of the light between the lasers is at least equal to half the duration of the pulses and the repetition time of the pulses is at least twice the duration of the pulse, while the pulses for the second laser lag with respect to those for the first laser by a time difference equal to the transit time of the light between the lasers.

Thus, a repeated amplification of reflected light is avoided, since this reflected light always arrives at least at one of the lasers at an instant when this laser does not amplify or amplifies only slightly, so that no spontaneous self-oscillation can occur.

The invention will be described more fully with reference to a drawing in which.

Figure 1:
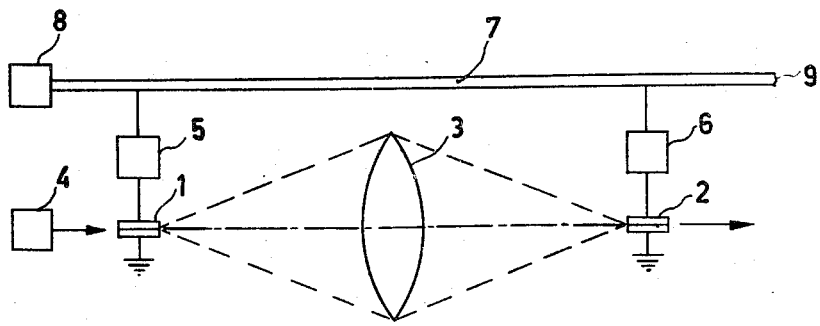
FIG. 1 shows an amplifier comprising two lasers.

The amplifier shown in FIG. 1 comprises two diode lasers 1 and 2, the output of the laser 1 being optically reproduced by means of a lens 3 on the input of the laser 2. The optical coupling may, in principle, be achieved in a different manner, for example by means of a hollow mirror or a thin rod of transparent material guiding the light. The light to be amplified from a source 4 (shown diagrammatically), for example a star, is fed to the input of the laser 1 and the amplified light is derived from the output of the laser 2. The length of the lasers may be of the order of 0.1 mm. and their relative distance may be 30 cms. The supply current of the lasers 1 and 2 is obtained from the sources 5 and 6.

If the two lasers were fed by a constant current, the light of the source 4 would be amplified by the laser 1, be supplied via the lens 3 to the input of the laser 2 and be again amplified. Part of this amplified light is reflected, supplied again via the lens 3 to the laser 1 and reamplified. Part of this amplified light is again reflected and fed via the lens 3 to the laser 2. This repeated amplification may give rise to self-oscillation.

In order to avoid this phenomenon the amplification factor of the lasers must be adjusted to a comparatively low value, so that the resultant total amplification is small. In accordance with the invention the supply current of the two lasers is modulated by periodic pulses so that only for part of the time amplification occurs. To this end the supply sources 5 and 6 are constructed in the form of gate circuits, the control-inputs of which are connected to tappings of a delay line 7, which is fed at the left-hand end by the pulse source 8 and is terminated at the right-hand end in a reflection-free manner by an impedance 9. The tappings of the delay line 7 are chosen so that the supply pulses fed to the laser 2 via the gate 6 lag with respect to the supply pulses fed via the gate 5 to the laser 1 with a delay approximately equal to the transit time between the lasers. With a distance between the lasers of 30 cms. the pulse repetition frequency may be 250 mc./s. The duration of the supply pulses is equal to or lower than half the pulse repetition period.

Figure 2:
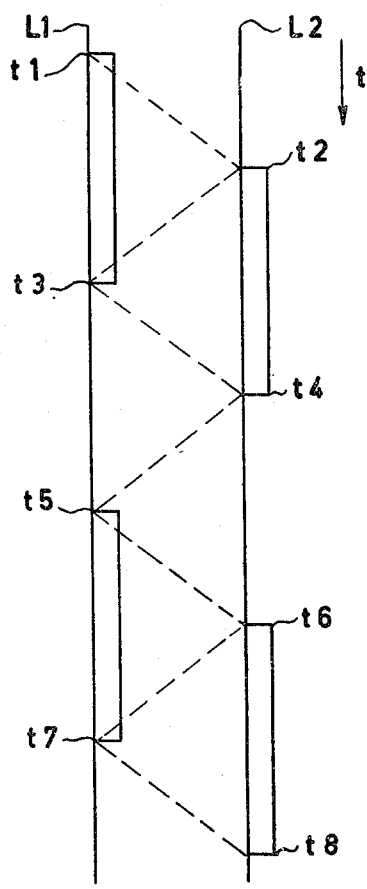
FIG. 2 shows the corresponding transit-time diagram.

FIG. 2 shows a diagram of the supply pulses as a function of time. The time $t$ is plotted from top to bottom. The line $L_1$ corresponds to the laser 1 and the line $L_2$ corresponds to the laser 2. The supply current of the laser 1 is modulated by pulses so that amplification occurs between the instants $t_1$ and $t_3$, $t_5$ and $t_7$, and so on, whereas the laser 2 is fed by pulses so that these pulses are amplified during the periods $t_2$ to $t_4$, $t_6$ to $t_8$, and so on. Light amplified by the laser 1 between the instants $t_1$ and $t_3$ reaches the laser 2 between the instants $t_2$ and $t_4$ and is amplified there and obtainable at the output. Part of this light is reflected and reaches the laser 1 during the time interval from $t_3$ to $t_5$. For this time interval this laser is inoperative or the amplification is so small that the light reflected by this laser 1 towards the laser 2 is attenuated. The light reaches the laser 2 during the time interval from $t_4$ to $t_6$. This is an inoperative period so that this light is again attenuated, when it is reflected towards the laser 1. This light reaches the laser 1 during the operative period from $t_5$ to $t_7$, it is true, but it is attenuated with the reflection on inoperative lasers to an extent such that it is weaker than the initial light, so that self oscillation will not occur.

What is claimed is:

1. A light amplifier comprising a first diode laser for receiving light to be amplified, a second diode laser spaced from and optically coupled to said first diode laser for deriving and producing amplified light from said first diode laser, means to supply an energizing current modulated with periodic pulses to each of said lasers, the transit time of light between said lasers being at least equal to half the duration time of the pulses and the repetition time of the pulses being at least twice the duration time of the pulses, and means to delay pulses supplied to said second laser which lag with respect to those for the first laser by a time difference equal to the transit time of the light between the first and second lasers.

2. A light amplifier comprising a first diode laser for receiving light to be amplified, a second diode laser spaced from and optically coupled to said first diode laser for deriving and producing amplified light from said first diode laser, means to supply to each of said lasers an energizing current modulated with periodic pulses including a delay line terminated at one end in a reflection-free impedance, first means for supplying pulses from a portion of said delay line to said first laser including a first gate circuit and second means for supplying pulses from a second portion of said delay line to said second laser including a second gate circuit, the transit time of light between said lasers being at least equal to half the duration time of the pulses and the repetition time of the pulses being at least twice the duration of the pulses, the pulses being supplied to said second laser lagging with respect to those supplied to the first laser by a time difference equal to the transit time of the light between the first and second lasers.

No references cited.

ROY LAKE, *Primary Examiner.*